US007997073B2

(12) United States Patent
Keuper et al.

(10) Patent No.: US 7,997,073 B2
(45) Date of Patent: Aug. 16, 2011

(54) HYDRAULIC CONTROL SYSTEM

(75) Inventors: Gerhard Keuper, Leonberg (DE); Heinrich Loedige, Vaihingen (DE); Peter Stachnik, Markgroeningen (DE); Milan Djurovic, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 12/194,941

(22) Filed: Aug. 20, 2008

(65) Prior Publication Data

US 2009/0053078 A1 Feb. 26, 2009

(30) Foreign Application Priority Data

Aug. 22, 2007 (DE) ......................... 10 2007 039 732
Sep. 25, 2007 (DE) ......................... 10 2007 045 803

(51) Int. Cl.
*F16D 31/02* (2006.01)

(52) U.S. Cl. ........................................... 60/422; 60/469

(58) Field of Classification Search .................... 60/420, 60/422, 468, 469; 91/516
See application file for complete search history.

(56) References Cited

U.S. PATENT DOCUMENTS 5,129,230 A * 7/1992 Izumi et al. ..................... 60/468
5,493,861 A * 2/1996 Friedrichsen .................. 60/328
6,405,529 B1 * 6/2002 Berg et al. ....................... 60/422
7,870,728 B2 * 1/2011 Keuper et al. ................... 60/422
2009/0007556 A1 * 1/2009 Djurovic et al. ................ 60/420

FOREIGN PATENT DOCUMENTS

DE 10 2006 008 940 8/2007

* cited by examiner

*Primary Examiner* — Michael Leslie
(74) *Attorney, Agent, or Firm* — Michael J. Striker

(57) ABSTRACT

A hydraulic control system for controlling preferably at least two consumers, has a pump supplying the consumers with a pressure medium and having an adjustable pump capacity, an adjustable metering orifice assigned to each of the consumers, a power-beyond connection to which at least one power-beyond consumer is attachable, an inlet pressure scale connected downstream of the pump and provided in a pressure medium flow path between the pump and at least one of the two consumers, wherein the power-beyond connection branches off in the pressure medium flow path between the pump and the inlet pressure scale, a spring with a force acting upon the inlet pressure scale in a closing direction, an inlet having a pressure acting upon the inlet pressure scale in an opening direction, wherein the inlet pressure scale is configured so that it is actable upon in the closing direction selectively by either a highest load pressure or by a pressure that is greater than the highest load pressure.

18 Claims, 4 Drawing Sheets

HYDRAULIC CONTROL SYSTEM

CROSS-REFERENCE TO A RELATED APPLICATION

The invention described and claimed hereinbelow is also described in German Patent Applications DE 10 2007 039 732.3 filed on Aug. 22, 2007 and DE 10 2007 045 803.9 filed on Sep. 25, 2007. This German Patent Application, whose subject matter is incorporated here by reference, provides the basis for a claim of priority of invention under 35 U.S.C. 119(a)-(d).

BACKGROUND OF THE INVENTION

The present invention relates to a hydraulic control system for controlling several consumers.

Hydraulic control systems of this type are used, in particular, in mobile working devices, e.g., wheel loaders or tractors, in order to supply their consumers, e.g., the working hydraulics, steering, ground drives, and/or add-on equipment, with pressure medium. Publication DE 10 2006 008 940.5 makes known a hydraulic control system that is designed as an LS system. With an LS system of this type, the pump capacity of the pump is regulated such that a pump pressure exists in the pump line that is higher than the highest load pressure of the consumers by a certain pressure difference $\Delta p$.

With the known systems, an adjustable metering orifice and an individual pressure scale are assigned to each consumer, via which the volumetric flow of pressure medium to the consumer may be adjusted as a function of the opening cross-section of the metering orifice, independently of the load. With this LS system, an inlet pressure scale may be provided downstream of the pump, via which a connection with the tank may be established. The inlet pressure scale is acted upon in the closing direction by a control pressure that corresponds to the highest load pressure, and by a spring, and it is acted upon in the opening direction by the pump pressure. Its position is a measure of the difference between the pump pressure and the highest load pressure.

A power-beyond connection—which includes a pressure line, a return line, and an LS line—is provided to connect combine-mounted devices or add-on equipment that do not have their own pressure-medium supply. This power-beyond connection enables the load-sensing system of the working device to be used also with the combine-mounted device. The power-beyond connection—for connecting a power-beyond consumer—branches off from the pressure medium flow path between the pump and the inlet pressure scale. The application of pressure to the inlet power scale on the spring side takes place via one of the load pressures of the consumers of the working hydraulics, or a power-beyond consumer. This hydraulic control system ensures that the power-beyond consumers are supplied in a prioritized manner, and that the regulating pressure difference between the pump pressure and the highest load pressure is raised when power-beyond consumers are supplied.

In accordance with DE 10 2006 008 940.5, the regulating pressure difference is increased by increasing the spring preload of the control piston of the inlet pressure scale by using only one spring or by using an additional spring. In a transition phase, the control piston of the inlet pressure scale must travel a path for a certain period of time. This influences the transfer behavior of the system.

SUMMARY OF THE INVENTION

In contrast, the object of the present invention is to create a suitable hydraulic control system with an improved transfer behavior.

A hydraulic control system is provided for controlling preferably at least two consumers, which are suppliable with a pressure medium via a pump with an adjustable pump capacity, and to each of which an adjustable metering orifice is assigned, in particular a hydraulic control system of a mobile working device, with a power-beyond connection, to which at least one power-beyond consumer is attachable, and with an inlet pressure scale that is connected downstream of the pump, the inlet pressure scale being provided in the pressure medium flow path between the pump and at least one of the two consumers. The power-beyond connection branches off in the pressure medium flow path between the pump and the inlet pressure scale. The inlet pressure scale is acted upon in the closing direction by the force of a spring and in the opening direction by the pressure at its inlet. The hydraulic control system is characterized by the fact that the inlet pressure scale may also be acted upon in the closing direction selectively by either the highest load pressure or by a pressure that is greater than the highest load pressure. The pressure increase of the pump may be realized hydraulically in this manner, thereby improving the transfer behavior of the system.

It is preferable for the pressure above the highest load pressure to be measured at a pressure-medium path between the inlet of the inlet pressure scale and a load-sensing line for the highest load pressures, thereby making it possible to realize the pressure above the highest load pressure with minimal outlay for switching technology.

The pressure above the highest load pressure is preferably measured between two orifices. The two orifices therefore serve as a pressure divider. The pressure differential relative to the highest sensed load pressure may therefore be fine-tuned by varying the geometries of the orifices.

In an advantageous embodiment, the pressure medium path may be switched between the inlet of the inlet pressure scale and the load-sensing line for the highest load pressure using a switching valve. It is further preferred that a switching valve is provided between one of the orifices and the inlet of the inlet pressure scale. With an electrical control of the switching valve in particular, a short response time for switching the inlet pressure scale may be implemented.

In a refinement, a further switching valve is provided between the two orifices and the precontrol connection of the inlet pressure scale, via which the inlet pressure scale may be acted upon in the closing direction. Preferably, the further switching valve may be used to switch a pressure-medium connection between the precontrol connection of the inlet pressure scale and an outlet connection to at least one of the two consumers. As a result, the pump pressure may be raised to a maximum pressure level, so that all consumers may operate in a constant-pressure system, thereby enabling a comfort function to be realized.

A priority valve may be provided between the pump and the inlet pressure valve, via which a pressure-medium supply of a priority valve may be implemented with minimal outlay for switching technology. As an alternative, a priority consumer may be suppliable with pressure medium via an auxiliary pump and via a pump, or a priority consumer may be suppliable only via an auxiliary pump. If undersupply by the main pump occurs, or if a high dynamic load is placed on the main pump, it is therefore ensured that the priority function may be implemented. The auxiliary pump is preferably a fixed-delivery pump.

The pressure between the pump and the inlet pressure scale is preferably limitable via a pressure-limiting valve, thereby ensuring that a pressure increase at the pump beyond a maximum pressure level may be avoided.

It is also possible to perform an electronic setpoint-value determination of the quantities demanded by all consumers to be supplied, and to increase the hydraulic pressure when the electronic control is defective, thereby resulting in improved transfer behavior.

The pump may be controlled depending on the position of a control piston of the inlet pressure scale or depending on a residual volumetric flow at a tank connection of the inlet pressure scale, thereby ensuring that an electronic control may react rapidly to changed pressure conditions at the inlet pressure scale.

In an advantageous refinement, the inlet pressure scale, when in a spring-preloaded home position, blocks the connection to at least one of the two consumers and the tank, and, when moved in the opening direction, establishes the connection with at least one of the two consumers first, and then with the tank. When the pump is controlled via a residual volumetric flow that flows to the tank, the inlet pressure scale is located just barely in the third position. In this position, the pressure scale also allows excess quantities to flow to the tank.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
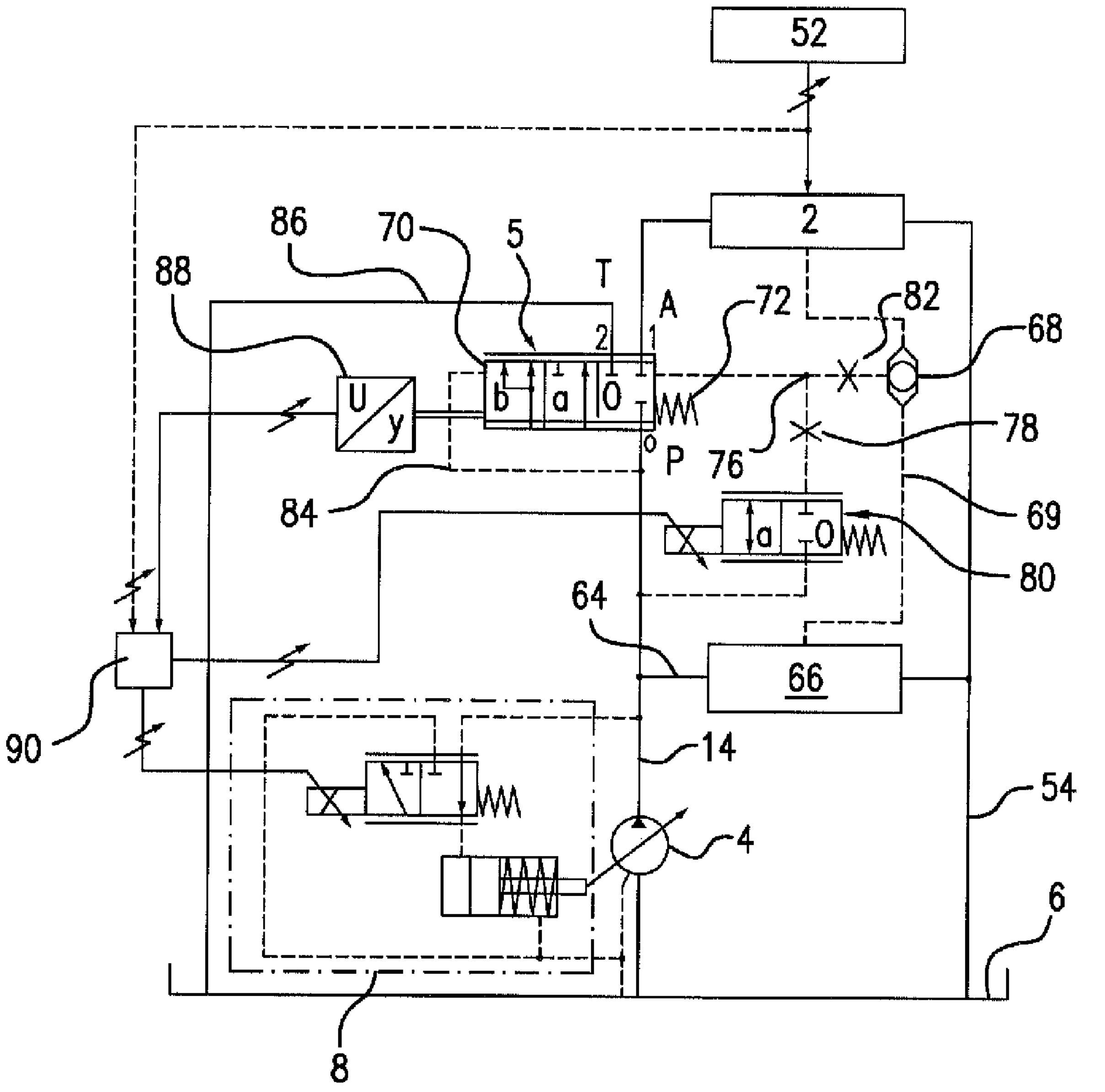
FIG. 1 shows a hydraulic control system in accordance with a first exemplary embodiment.

FIG. 1 shows a first exemplary embodiment of a hydraulic control system of a mobile working device, e.g., a tractor. This control system may be, e.g., a mobile control block, via which working hydraulics 2 are supplied with pressure medium that is pumped by a pump 4 and is supplied to the consumers via an inlet pressure scale 5 and working hydraulics 2, which then return the pressure medium to a tank 6. In the exemplary embodiment shown, pump 4 is designed as an electrically controllable, variable-displacement pump whose pivot angle is adjustable via a pump regulator 8. Instead of an electrically controllable, variable-displacement pump, it is also possible to use a speed-regulated, fixed-delivery pump or any other type of pump that is controllable using a pump regulator.

Figure 2:
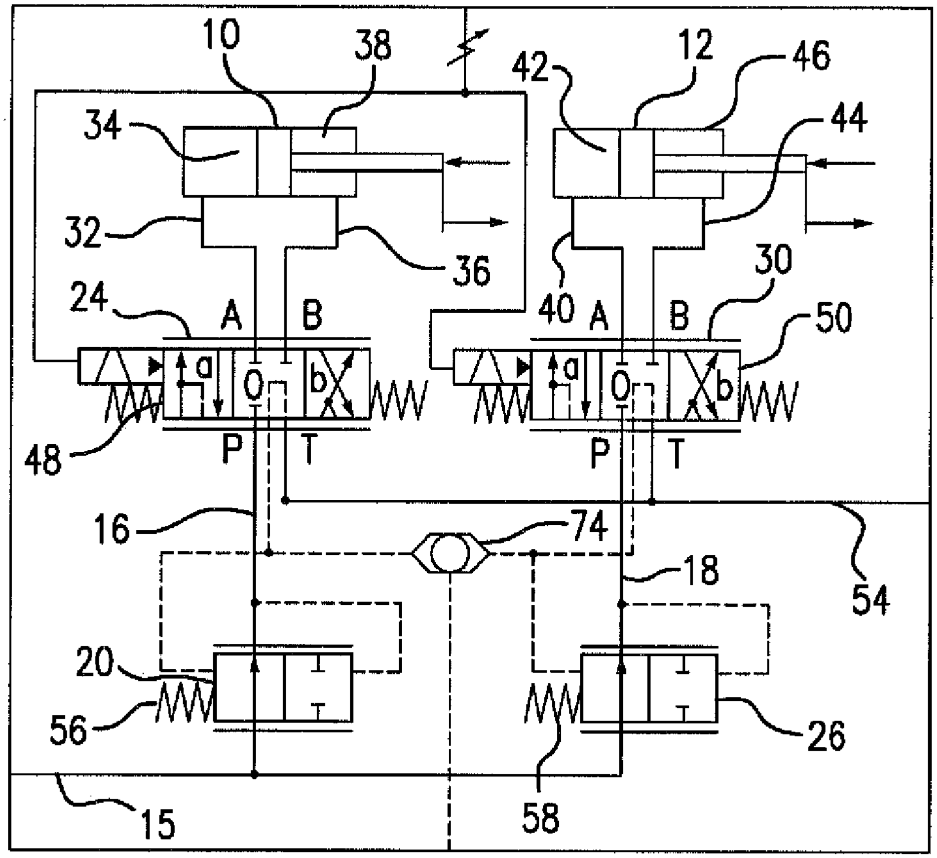
FIG. 2 shows a section of the hydraulic control system in accordance with the first exemplary embodiment.

FIG. 2 shows the design of working hydraulics 2 in FIG. 1, which includes two dual-action cylinders 10, 12 in this case. The pressure medium (see FIG. 1) drawn by pump 4 out of tank 6 is pumped via inlet pressure scale 5 into a pump channel 15, which branches into two supply lines 16, 18, supply line 16 being assigned to cylinder 10, and supply line 18 being assigned to cylinder 12. An individual pressure scale 20 is provided in supply line 16, which leads to a constantly adjustable, directional-control valve 24. The flow direction of the pressure medium to the assigned consumer or from the assigned consumer, and the pressure-medium volumetric flow relative to the assigned consumers is adjustable via directional-control valve 24. An individual pressure scale 26 is provided in supply line 18, which leads to a constantly adjustable, directional-control valve 30.

The flow direction of the pressure medium to the assigned consumer or from the assigned consumer, and the pressure-medium volumetric flow relative to the assigned consumers is adjustable via directional-control valve 30. A supply line 32, which is connected with a bottom-side cylinder chamber 34 of cylinder 10, is connected to working connections A, B of directional-control valve 24, and a return line 36, which is connected with an annular space 38—on the piston rod side—of cylinder 10, is connected. A supply line 40, which is connected with a bottom-side cylinder chamber 42 of cylinder 12, is connected to working connections A, B of directional-control valve 30, and a return line 44, which is connected with an annular space 46—on the piston rod side—of cylinder 12, is connected.

Control piston 48 of directional-control valve 24 and control piston 50 of directional-control valve 30 are controlled via a precontrol device 52 shown in FIG. 1, or via manual actuation. Via manual actuation, or by actuating precontrol device 52, by way of which the control pressure differential is adjusted, particular control piston 48 or 50 is displaced from the blocking position (0) shown in FIG. 2, in the direction of positions (a) or (b) shown, in which cylinder chamber 34, 42 or annular chamber 38, 46 is supplied with pressure medium, while the pressure medium is displaced from the other pressure-medium chamber. In so doing, an inlet metering orifice into directional-control valves 24, 30 is controlled via a supply control edge. The opening cross section of the particular supply metering orifice determines the pressure-medium volumetric flow to cylinder 10, 12. The pressure medium flowing back from cylinder 10, 12 is returned to tank 6 (see FIG. 1) via a tank connection T to particular directional-control valve 24, 30 and a tank line 54 connected thereto.

Individual pressure scales 20, 26 are acted upon in the opening direction by the force of a pressure-scale spring 56, 58 and by the load pressure on particular consumer 10, 12. In the closing direction, the pressure in supply line 16 or 18 between the outlet of particular individual pressure scale 20, 26 and pressure inlet P of downstream directional-control valve 24, 30 acts on the pressure-scale sliding element of individual pressure scales 20, 26. A current regulator is formed by particular individual pressure scale 24, 30 and assigned metering orifice, which is formed by particular directional-control valve 24, 30. The pressure 5 decrease via its measurement orifice is held constant independently of the load. The quantity of pressure medium flowing through the measurement orifice therefore depends only on the opening cross section of the measurement orifice.

As shown in FIG. 1, inlet pressure scale 5 is provided in the pressure-medium flow path between the pressure connection of pump 4 and the branching point of supply lines 16, 18 (see FIG. 2). In this exemplary embodiment, inlet pressure scale 5 is designed as a continually adjustable, 3/3 directional control valve.

A power-beyond connection 64 branches off from a pump line 14 between pressure connection of pump 4 and inlet connection P of inlet pressure scale 5. Via these connections, it is possible to connect one or more additional hydraulic power-beyond consumers 66, e.g., a self-loading forage wagon or a potato harvesting machine, to the mobile working device.

Power-beyond consumers 66 may also be connected with tank 6 via tank line 54. The highest load pressure of power-beyond consumers 66 is determined via a cascade of shuttle valves, and is supplied to directional-control valve 68 via a control line 69. The highest load pressure of consumers 10, 12 is determined via directional-control valve 74 (see FIG. 2), and is also supplied to directional-control valve 68.

Sliding element 70 of inlet pressure scale 5 is acted upon in the closing direction by the force of a spring 72, and by the pressure at a branching-off point 76 of a pressure-medium path between the central connection of directional-control valve 68 and pump line 14. An orifice 78 and a 2/2 switching valve 80 are connected in series in the pressure-medium path, between branching-off point 76 and pump line 11. An orifice 82 is located in the pressure-medium path, between branching-off point 76 and directional-control valve 68. The 2/2 switching valve 80 is actuated electrically and is shown in FIG. 1 in the spring-preloaded blocking position.

When a control voltage is applied to switching valve 80, the pressure-medium path between pump line 14 and orifice 78 opens. Due to the different pressure levels at pump line 14 and directional-control valve 68, a volumetric flow flows via orifices 80, 82, which act as a pressure divider. The pressure at branching-off point 76 bears against the spring side of sliding element 70, and it is higher than the highest load pressure sensed at the directional-control valve 68. This pressure increase results in the desired pressure increase in the system.

To increase the pressure in the system in accordance with the first exemplary embodiment of the present invention, a minimal volumetric flow to the consumer with the highest load—which may be cylinder 10, 12 or a power-beyond consumer 66—must flow in the load-sensing line. For this reason, all directional control valves 74, 68 must be suitable for this flow direction.

The pressure differential between the pressure at branching-off point 76 and directional control valve 68 may be fine-tuned by varying the geometry of orifices 78, 82 when a maximum permissible volumetric flow is specified.

Spring 72 shown in FIG. 1 and the pressure that is present at branching-off point 76 and acts on sliding element 70 apply a force to sliding element 70 in the closing direction. In the opening direction, the pressure in a control line 84 acts on sliding element 70 of inlet pressure scale 5. This pressure is measured upstream of inlet pressure scale 5 of pump line 14, between power-beyond connection 64 and inlet pressure scale 5. When a power-beyond consumer 66 is switched on, switching valve 80 is also switched. The target position of pressure-scale sliding element 70 is therefore not reached until the pump pressure is higher. This target position may be the same as it was before the pressure increase. It is preferably located in the region of position (b) of the pressure scale, thereby resulting in a residual volumetric flow to the tank and a damping of the system. The aim is to attain a constant EDW positional setpoint value, independently of whether the power-beyond consumer is active or not.

Inlet connection P of the inlet pressure scale has a pressure-medium connection with pump line 14. Working connection A of inlet pressure scale 5 is connected with supply line 16, 18 (see FIG. 2) via pump channel 15. Tank connection T of inlet pressure scale has a pressure-medium connection with tank 6 via a tank line 86.

In the blocked position (0) of inlet pressure scale 5 shown in FIG. 1, there is no pressure-medium connection between pump connection P, working connection A, and tank connection T. In working position (a), a pressure-medium connection exists between pump connection P and working connection A. In working position (b), pump connection P, working connection A, and tank connection T have a pressure-medium connection.

The position of sliding element 70 of inlet pressure scale is detected via a displacement sensor 88, whose output signal is sent to a control device 90, which also controls pump regulator 8.

Figure 3:
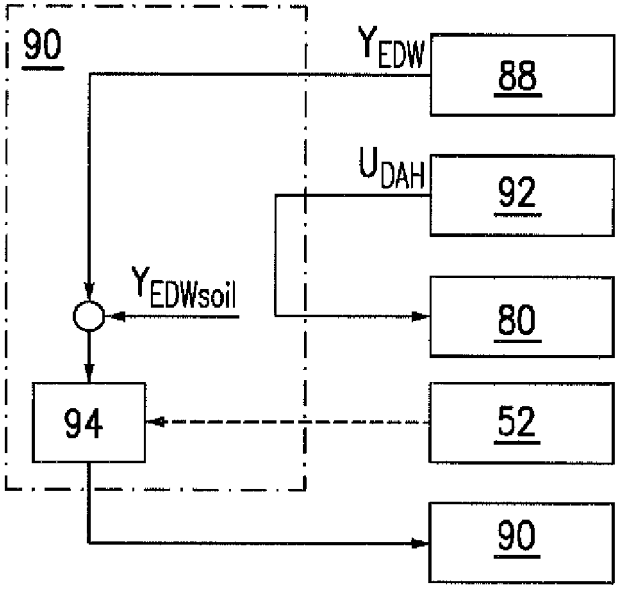
FIG. 3 shows a control concept in accordance with the first exemplary embodiment.

The actuation of pump regulator 8 via control device 90 will now be described in greater detail with reference to FIG. 3, which shows a control concept for the hydraulic control system. An internal setpoint value $y_{EDWsoll}$ is sent to control device 90. When power-beyond consumer 66 is connected, a power-beyond control 92 initiates the pressure increase, by actuating switching valve 80. Power-beyond control 92 is initialized via a signal from a user, or automatically.

Setpoint value $y_{EDWsoll}$ is compared with an output signal $y_{EDW}$ of displacement sensor 88, and it is supplied to a regulator 94 in control device 90. Setpoint value $y_{EDWsoll}$ corresponds to position (b) of sliding element 70 of the inlet pressure scale. As shown in FIGS. 1 and 3, the output signals of precontrol device 52 may also be sent to regulator 84 and be applied to the regulation algorithm.

When a power-beyond consumer 66 is not connected, input pressure scale 5 (see FIG. 1) is displaced from the blocking position (0) to working position (b). Pump 4 swivels outwardly and the required quantity of pressure medium is therefore increased. When the inlet pressure scale reaches its setpoint position, the pump pressure is high enough. The pump does not swivel outwardly any further. In working position (b) of inlet pressure scale 5, it is ensured that the pressure medium is supplied to consumers 10, 12 by pump 4 via inlet pressure scale 5 (see FIG. 2). A residual volumetric flow flows via tank connection T and tank line 86.

If, when a power-beyond consumer 66 is activated, switching valve 80 is moved into its switching position (a), a pressure-medium flow flows from pump line 14 via opened switching valve 80 and orifices 78, 82 to directional-control valve 68. Orifices 78, 82 act as pressure dividers, with a higher pressure than the highest load pressure sensed at directional-control valve 68 being present at branching-off point 76, and, therefore at sliding element 70 toward its blocking position. When the pressure increase in pump line 14 is sufficient, inlet pressure scale 5 in working position (b) is held in its setpoint position, in which a residual volumetric flow flows off once more via tank connection T and tank line 86. Even when the volumetric flow requirement of power-beyond consumer 66 is high, consumers 10, 12 and power-beyond consumers 66 are supplied with a sufficient quantity of pressure medium, provided that pump 6 is designed accordingly.

With the hydraulic control system according to the first exemplary embodiment, it is ensured that, if undersupply occurs, inlet pressure scale 5 is displaced in the closing direction, and the pressure-medium flow to the other consumers 10, 12 is reduced or halted by inlet pressure scale 5, therefore preventing an undersupply of power-beyond consumer 66, thereby giving it priority.

In an alternative embodiment of the first exemplary embodiment, displacement sensor 88 is replaced with a residual current sensor at tank line 86. By measuring the residual volumetric flow directly in working position (b), the pump may be controlled in a sensitive and accurate manner. Since, with the hydraulic control system according to the first exemplary embodiment, the positional setpoint value of inlet pressure scale 5 may be independent of the activation status of the pressure increase, it may be replaced with a residual volumetric flow setpoint value.

Sliding element 70 of inlet pressure scale 5 then has the same position at a high pump Δp as it does with a low pump Δp. The influence of the absolute level of the pump pressure on the residual volumetric flow, the position of pressure scale sliding element 70 and pump Δp is negligible. In addition, a soft spring 72 may be used, which ensures that, when there is a minimal change in position of sliding element 70 of inlet pressure scale 5, this has a minimal effect on the pressure of pump 4.

Moreover, the control may be adjusted by control device 90 in a manner such that, if pump 4 becomes under-supplied and closes inlet pressure scale 5 to a certain extent, so that one of the consumers becomes slower or comes to a standstill, the volumetric flow values of all active consumers of the working hydraulics are reduced in the same proportion until this state of under-supply is alleviated. Inlet pressure scale 5 opens, and it may function in switching position (b) with the specified residual flow value.

Figure 4:
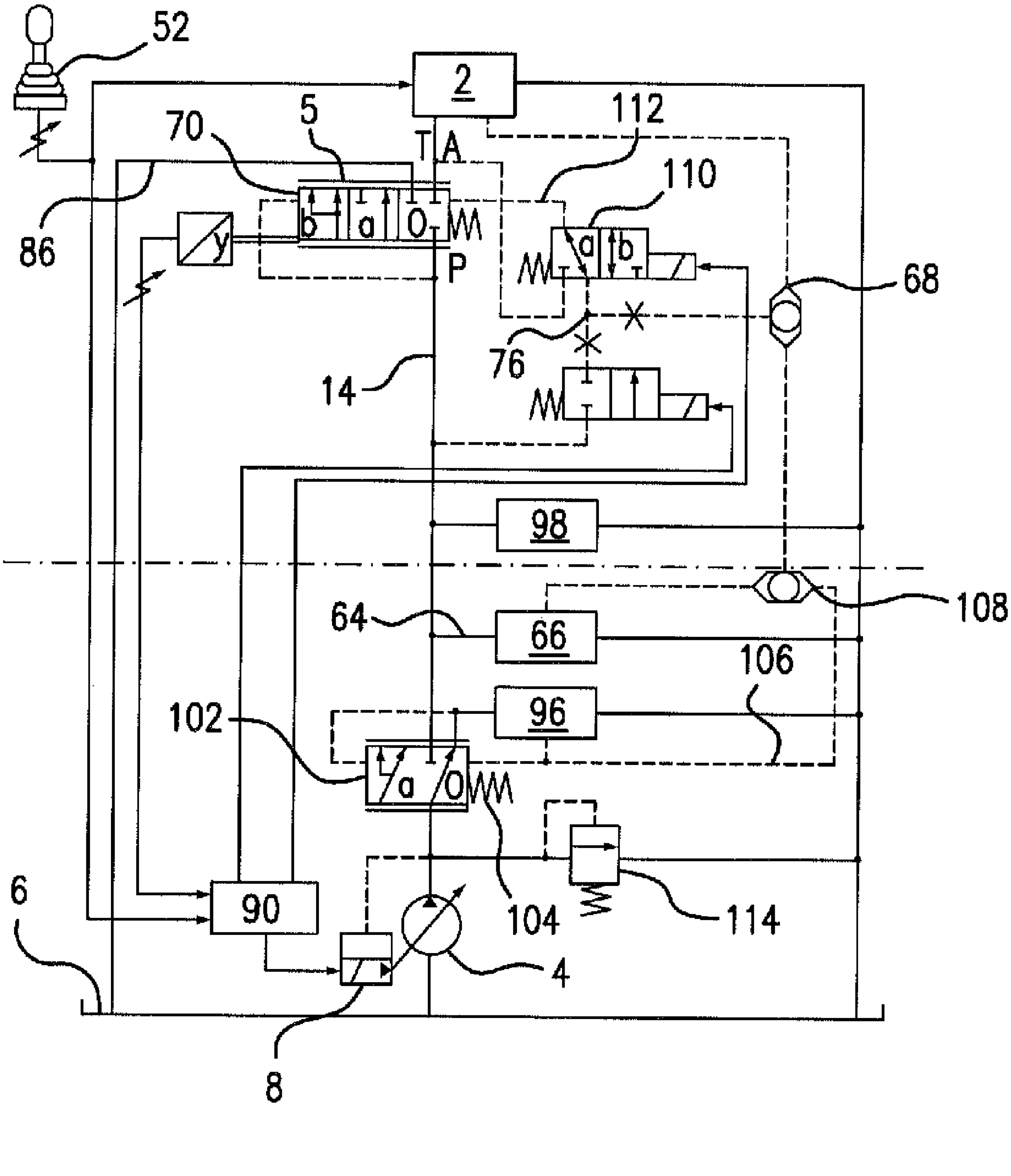
FIG. 4 shows a hydraulic control system in accordance with the second exemplary embodiment.

FIG. 4, which shows a second exemplary embodiment of the present invention, differs from the first exemplary embodiment in that priority functions of a priority consumer 96 and comfort functions of a comfort consumer 98 are incorporated in the concept of the hydraulic pressure increase of the first exemplary embodiment.

The following changes were made to the hydraulic control system shown in FIG. 1 in order to implement the priority function: A priority valve 100 designed as a 3/2 directional-control valve is connected in pump line 14, in whose spring-preloaded position (0) a pressure-medium connection is established between the pressure connection of pump 4 and the inlet connection of priority consumer 96 (control valve plus the actual consumer), while the pressure-medium connection to pump connection P of pressure scale 5 is blocked. In position (a) of priority valve 100, the pressure-medium connection from pump 4 to the inlet connection of priority consumer 96 and to pump connection P of inlet pressure scale 5 is open.

Control piston 102 of priority valve 100 is acted upon in the closing direction by the pressure of a spring 104 and the load pressure of the priority consumer on a load-pressure line 106, and in the opening direction by the pressure at the inlet connection of priority consumer 96. The load pressure of the priority consumer on load-pressure line 106 is compared via a directional-control valve 108 with the load pressure of power-beyond consumer 66, and the higher of the two is reported to directional-control valve 68.

For normal operation, the pressure at branching-off point 76 between orifices 78 and 82 in the second exemplary embodiment, shown in FIG. 4, acts via a comfort valve 110 in its neutral position (a) on sliding element 70 of inlet pressure scale 5. Comfort valve 110 will be explained below in conjunction with the comfort function.

To prevent an excessive pressure increase at the pressure connection of pump 4, a pressure-limiting valve 114 is connected with the pressure connection of pump 4.

The priority function is described below. The priority function enables implementation of, e.g., steering, the trailer braking function, or transmission lubrication, which must be given top priority in terms of the supply of pressure medium. Priority consumer 96 and power-beyond consumer 66 are an unknown consumer. Given a high load pressure in load-pressure line 106, and given under-supply by pump 4, priority valve 100 is located in position (0) shown in FIG. 4, in which there is a pressure-medium connection between the pressure connection of pump 4 and only the inlet connection of priority consumer 96. The pressure at the inlet connection of priority consumer 96 acts on control piston 102 of priority valve 100 in its opening direction, while the pressure of spring 104 and the load pressure of priority consumer 96 act in the closing direction. As soon as the pressure at the inlet connection exceeds the sum of the pressure applied by spring 104 and the load pressure of priority consumer 96, priority valve 100 is moved into its position (a), in which a pressure-medium connection is established between the pressure connection of pump 4 and the inlet connection of priority consumer 96 and pump connection P of inlet pressure scale 5. Cylinders 10, 12 shown in FIG. 2 may therefore also be supplied with pressure medium. When undersupply by pump 4 occurs once more, priority valve 100 is switched to position (0), in which the pressure-medium connection with cylinders 10, 12 is interrupted, and only priority consumer 96 is supplied with pressure medium.

Power-beyond connection 64 is located downstream of priority valve 100 in pump line 14.

Comfort functions, such as front-axle suspension, are typically not integrated in the hydraulic signal circuit of the supply system. In order to activate comfort consumer 98 shown in FIG. 4, which is also connected to pump line 14, downstream of priority valve 100, the pressure of pump 64 is raised to a maximum pressure level, which is regulated by the pressure cut-off of pump 4. This increase is carried out by electrically controlling comfort valve 110 in position (b), in which a pressure-medium connection from branching-off point 76 to sliding element 70 of the inlet pressure scale is blocked, while a pressure-medium connection between working connection A of inlet pressure scale 5 and a precontrol line 112 is open. The pressure scale now acts as a pressure-differential valve. It is unable to move into position (b), so the pump is controlled via control device 90 with the maximum control signal, due to the measurement performed with displacement sensor 88 or a residual current sensor in tank line 86. As a result, when the comfort function is implemented, all consumers are operated with a constant pressure, including priority consumer 96 and power-beyond consumer 66.

The other hydraulic elements of the control system according to the second exemplary embodiment correspond to those shown in the first exemplary embodiment, and will therefore not be described in greater detail.

Figure 5:
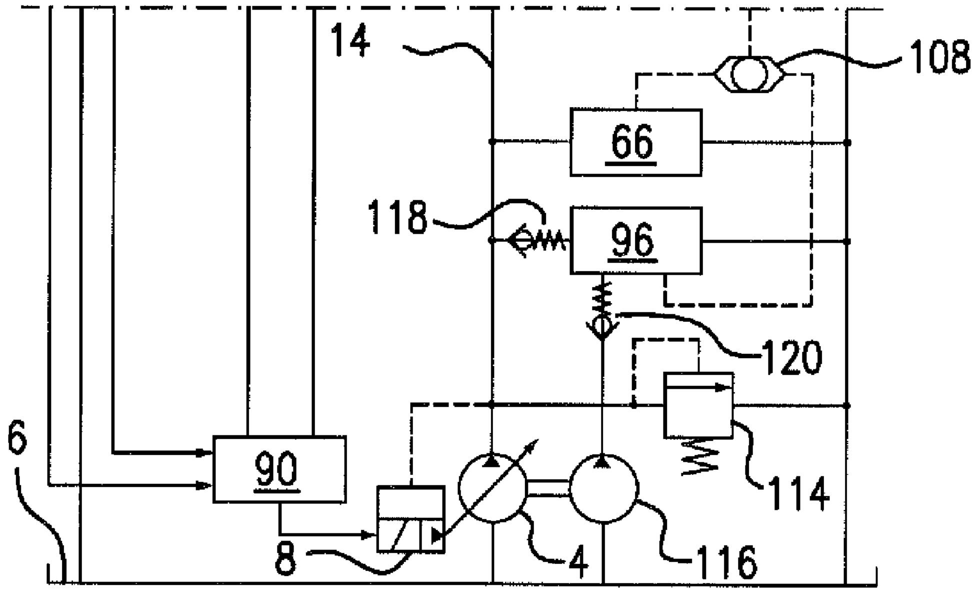
FIG. 5 shows a hydraulic control system in accordance with a first variation of the second exemplary embodiment.
Figure 6:
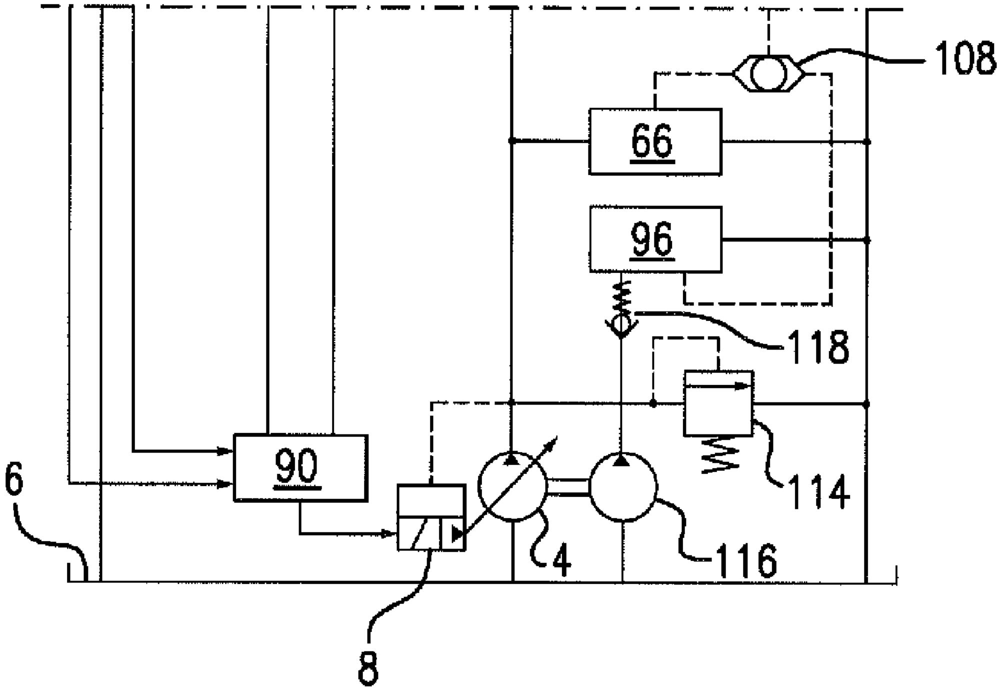
FIG. 6 shows a hydraulic control system in accordance with a second variation of the second exemplary embodiment.

FIGS. 5 and 6 show alternative designs of the second exemplary embodiment for implementation of the priority function. The upper part of the hydraulic circuit system, which is not shown in FIGS. 5 and 6, may be seen in the upper part of the hydraulic circuit system in FIG. 4.

Instead of priority valve 100 in FIG. 4, an auxiliary pump 116 that is mechanically coupled with pump 4 is used in FIGS. 5 and 6. Auxiliary pump 116 is preferably a fixed-delivery pump and may supply priority consumer 96 with pressure medium. The highest load pressure of priority consumer 96 and power-beyond consumer 66 is reported via directional-control valve 108 to directional-control valve 68, as in the second exemplary embodiment.

In the first variant, as shown in FIG. 5, the inlet connection of priority consumer 96 has a pressure-medium connection via return valve 118 with pump line 114 and the pressure connection of auxiliary pump 116. In the first variant of the second exemplary embodiment, pump 4 and auxiliary pump 116 supply pressure medium to priority consumer 96 when there is a high dynamic load on pump 4 or when there is an under-supply and it is the sole supplier of pressure medium.

The second variant of the second exemplary embodiment, shown in FIG. 6, differs from the first variant in that there is no pressure-medium connection between pump line 14 and the inlet connection of priority consumer 96. Priority consumer 96 is therefore supplied with pressure medium exclusively via auxiliary pump 116.

With the first and second variants of the second exemplary embodiment, power losses of the auxiliary circuit that occur when priority consumer 96 is inactive are reduced by a neutral circulation.

As an alternative to the hydraulic control system according to the first and second exemplary embodiments and their variants, it is possible to carry out an electronic setpoint value determination of all consumers to be supplied, and to incorporate them directly in the supply concept via control device 90 by adapting the valve setpoint values. With this, the transfer behavior of the hydraulic control system may be improved further, while retaining a high degree of flexibility. The hydraulic realization of the pressure increase and/or the prioritization of selected functions is limited when the electronic control is defective. During normal operation, the prioritization and/or complete volumetric flow distribution in the system would take place by modifying the valve setpoint values, and could be defined in any manner.

The present invention relates to a hydraulic control system for controlling at least two consumers, which are suppliable with a pressure medium via a pump with an adjustable pump capacity, and to each of which an adjustable metering orifice is assigned, in particular a hydraulic control system of a mobile working device. A power-beyond connection is provided, to which at least one power-beyond consumer is attachable. An inlet pressure scale is connected downstream of the pump, which is provided in the pressure medium flow path between the pump and at least one of the two consumers. The power-beyond connection branches off in the pressure medium flow path between the pump and the inlet pressure scale. The inlet pressure scale is acted upon in the closing direction by the force of a spring, and it is acted upon in the opening direction by the pressure at its inlet. In addition, the inlet pressure scale may also be acted upon in the closing direction selectively by either the highest load pressure or by a pressure that is greater than the highest load pressure.

It will be understood that each of the elements described above, or two or more together, may also find a useful application in other types of constructions differing from the types described above.

While the invention has been illustrated and described as embodied in a hydraulic control system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control system for controlling at least two consumers, comprising a pump supplying the consumers with a pressure medium and having an adjustable pump capacity; an adjustable metering orifice assigned to each of the consumers; a power-beyond connection to which at least one power-beyond consumer is attachable; an inlet pressure scale connected downstream of said pump and provided in a pressure medium flow path between said pump and at least one of the two consumers, wherein said power-beyond connection branches off in the pressure medium flow path between said pump and said inlet pressure scale; a spring with a force acting upon said inlet pressure scale in a closing direction; an inlet having a pressure acting upon said inlet pressure scale in an opening direction, wherein said inlet pressure scale is configured so that it is actable upon in the closing direction selectively by either a highest load pressure or by a pressure that is greater than the highest load pressure.

2. A hydraulic control system as defined in claim 1, further comprising a load-sensing line for the highest load pressure, so that the pressure above the highest load pressure is measured at a pressure medium path between said inlet of said inlet pressure scale and said load-sensing line for said highest load pressure.

3. A hydraulic control system as defined in claim 1, further comprising two orifices between which the pressure above the highest load pressure is measured.

4. A hydraulic control system as defined in claim 2, further comprising a switching valve, said pressure medium path being switchable between said inlet of said inlet pressure scale and said load-sensing line for said highest load pressure using said switching valve.

5. A hydraulic control system as defined in claim 4, wherein said switching valve is provided between one of said orifices and said inlet of said inlet pressure scale.

6. A hydraulic control system as defined in claim 4, further comprising a further switching valve between said two orifices and a precontrol connection of said inlet pressure scale, via which said inlet pressure scale is actable upon in the closing direction.

7. A hydraulic control system as defined in claim 6, wherein said further switching valve is configured so that with its use a pressure medium connection is switchable between the precontrol connection of said inlet pressure scale, via which said inlet pressure scale is actable upon in the closing direction, and an outlet connection with at least one of the two consumers.

8. A hydraulic control system as defined in claim 1, further comprising a priority valve provided between said pump and said inlet pressure scale, via which a priority consumer is suppliable with pressure medium.

9. A hydraulic control system as defined in claim 1, further comprising an auxiliary pump arranged so that a priority consumer is suppliable with pressure medium via said auxiliary pump and said pump.

10. A hydraulic control system as defined in claim 1, further comprising an auxiliary pump configured so that a priority consumer is suppliable with pressure medium only via said auxiliary pump.

11. A hydraulic control system as defined in claim 9, wherein said auxiliary pump is a fixed-delivery pump.

12. A hydraulic control system as defined in claim 1, further comprising a pressure-limiting valve configured for limiting a pressure between said pump and said inlet pressure scale.

13. A hydraulic control system as defined in claim 1, with which an electronic setpoint-value determination is carried out for all consumers to be supplied, and a hydraulic pressure is increased if the electronic control is defective.

14. A hydraulic control system as defined in claim 1, wherein said inlet pressure scale has a sliding element, said pump being controllable depending on a position of said sliding element of said inlet pressure scale.

15. A hydraulic control system as defined in claim 1, wherein said inlet pressure scale has a tank connection, said pump being controllable depending on a residual volumetric flow of said tank connection.

16. A hydraulic control system as defined in claim 1, wherein said inlet pressure scale is actable upon with the highest load pressure or a pressure above the highest load pressure in a manner such that a piston of said inlet pressure scale, when the power-beyond consumer is switched on and when the power-beyond connection is not switched on, has a position in a region of a working position of the piston in which a residual volumetric flow flows at a tank connection of said inlet pressure scale.

17. A hydraulic control system as defined in claim 16, wherein the position in the region of the working position of the piston in which a residual volumetric flow flows at a tank connection of said inlet pressure scale is the same when the power-beyond connection is switched on, and when it is switched off.

18. A hydraulic control system as defined in claim 1, wherein said inlet pressure scale, when in a spring-preloaded home position, blocks a connection to at least one of the two consumers and a tank, and when moved in the opening direction establishes a connection with at least one of the two consumers first, and then with the tank.

* * * * *